United States Patent
Dick

[11] 3,730,462
[45] May 1, 1973

[54] ENGINE MOUNT ASSEMBLY
[75] Inventor: Melvin E. Dick, Utica, Mich.
[73] Assignee: General Motors Corporation, Detroit, Mich.
[22] Filed: Apr. 26, 1972
[21] Appl. No.: 247,637

[52] U.S. Cl. ..................................248/10, 180/64 R
[51] Int. Cl. ..............................................F16f 15/00
[58] Field of Search..........................248/5, 9, 10, 15, 248/22, 358 R; 267/153; 287/85 R; 180/64 R

[56] References Cited
UNITED STATES PATENTS
| | | | |
|---|---|---|---|
| 2,684,819 | 7/1954 | Leggett et al. | 248/5 |
| 3,326,501 | 6/1967 | Cauvin | 248/9 |
| 3,402,782 | 9/1968 | Ljungstrom | 248/10 X |
| 3,565,373 | 2/1971 | Frye | 180/64 R X |

Primary Examiner—J. Franklin Foss
Attorney—J. L. Carpenter et al.

[57] ABSTRACT

An engine mount assembly for resiliently supporting an engine on a frame of a motor vehicle comprises inner and outer bushings between which resilient material is secured to control relative movement of the bushings in all directions. Brackets connect the bushings to the engine and the frame and also permit angular adjustment thereof. The outer bushing has a configuration such that the angular adjustment effects a change in the radial spring rate provided by the mount.

5 Claims, 5 Drawing Figures

ENGINE MOUNT ASSEMBLY

This invention relates to an engine mount assembly and more particularly to an engine mount assembly providing an adjustable spring rate.

In a motor vehicle it is customary practice to isolate engine vibrations from the passenger compartment by the use of resilient motor mounts to support the engine on the vehicle frame. In such an arrangement, these engine mounts cushion the jounce vibrations, fore and aft vibrations and torque and torque reaction vibrations and since these vibrations vary in frequency and amplitude in different engine and vehicle combinations, there is generally provided one particular engine mount for each application. Thus, there is a desire for a universal type engine mount that can be tuned to the different applications, however such a mount has not been readily forthcoming since tuning requirements have been found to require that there be adjustability in the compression and fore and aft spring rates without affecting the shear rate controlling engine roll.

The engine mount assembly according to the present invention includes an inner bushing and an outer bushing spaced radially outward of the inner bushing. Resilient material is secured between these members and the outer bushing has a configuration such that the resilient material provides varying resistance to relative movement between these members dependent upon the direction of such movement. Brackets are provided for attaching the inner bushing and the outer bushing to the engine and frame respectively and permit conjoint angular adjustment movement of these members to provide adjustable spring rates for controlling engine jounce and fore and aft movement without affecting a different spring rate which controls engine roll.

An object of the present invention is to provide a new and improved engine mount assembly for resiliently supporting an engine on a frame of a motor vehicle.

Another object is to provide an engine mount assembly for resiliently supporting an engine on a frame of a motor vehicle providing adjustable spring rates for controlling engine jounce and fore and aft movement and a constant spring rate for controlling engine roll.

Another object is to provide an engine mount assembly for resiliently supporting an engine on a frame of a motor vehicle providing an adjustable ratio of compression/fore-aft spring rates without affecting a shear rate controlling engine roll.

Another object is to provide an engine mount assembly for resiliently supporting an engine on a frame of a motor vehicle including a multiple bushing and resilient material arrangement that is angularly adjustable in the installation to effect a change in radial spring rates which are controlling engine jounce and fore and aft movement without affecting a spring rate which is controlling engine roll.

These and other objects of the present invention will be more apparent from the following description and drawing in which.

Figure 1:
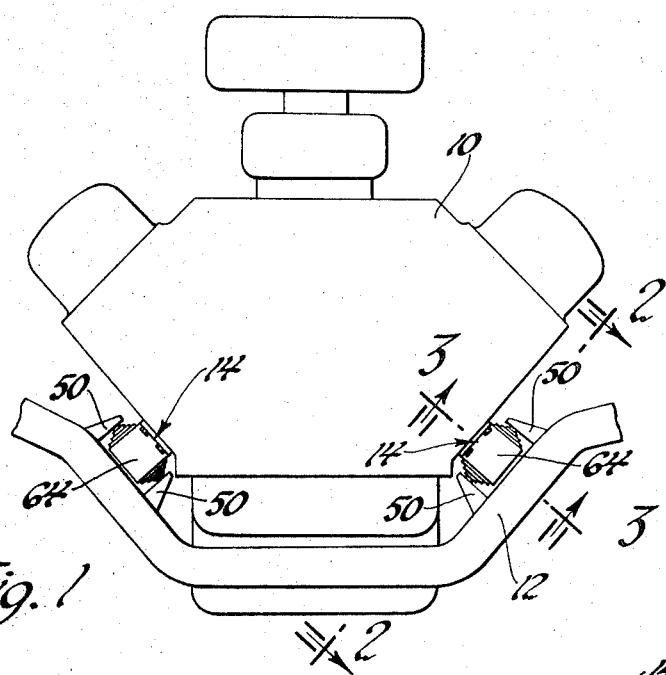
FIG. 1 is a front elevational view of an internal combustion engine resiliently supported on a frame of a motor vehicle by engine mount assemblies constructed according to the present invention.

Referring to FIG. 1, there is shown an internal combustion engine 10 which is supported at its opposite sides on a frame 12 of a motor vehicle by a pair of engine mount assemblies 14 constructed according to the present invention. The mounts 14 act as the forward support of the mounting system which may be of the three point type which has an additional centrally located rearward mount, not shown, whose attachment is between a transmission secured to the engine and a cross member of the frame.

Figure 2:
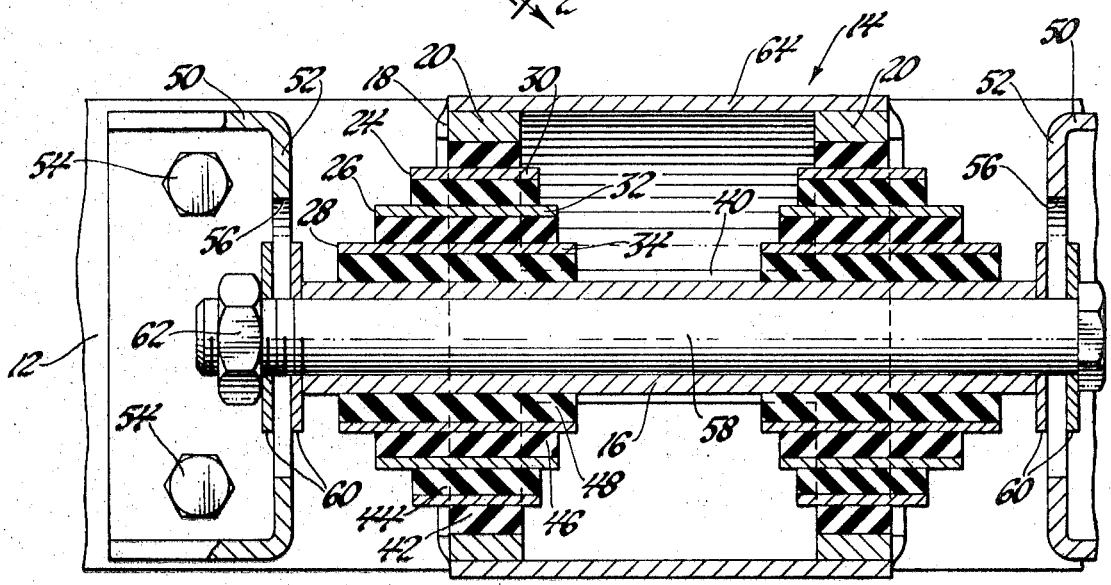
FIG. 2 is an enlarged sectional view of one of the engine mount assemblies taken on the line 2—2 in FIG. 1.
Figure 3:
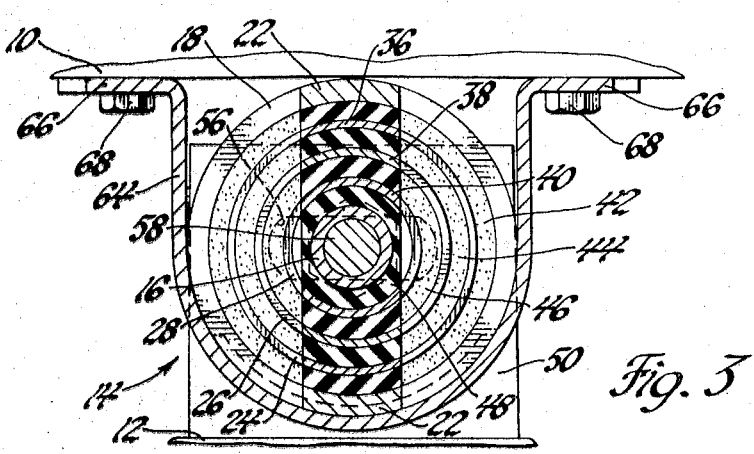
FIG. 3 is an enlarged sectional view of one of the engine mounts taken on the line 3—3 in FIG. 1.
Figure 4:
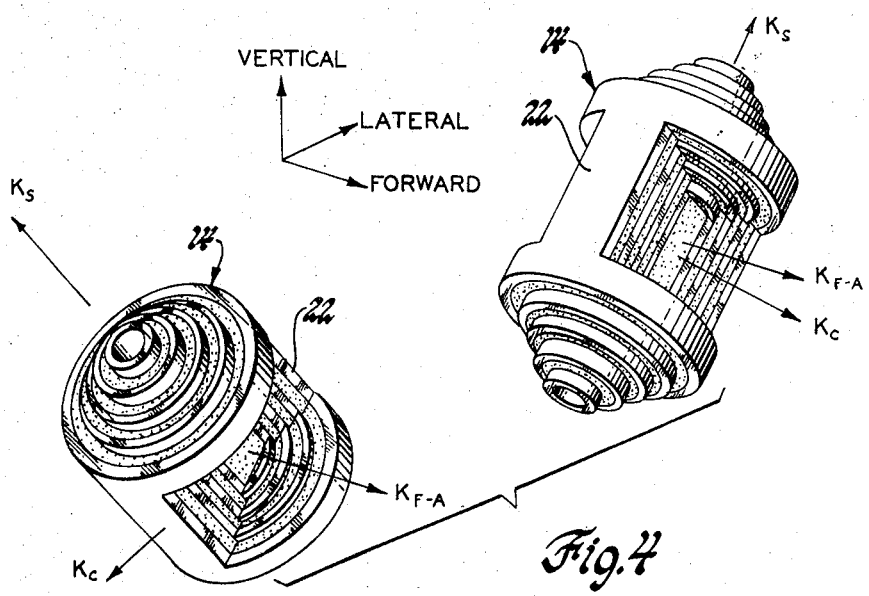
FIG. 4 is a perspective view of the adjustable portions of the engine mount assemblies shown in FIG. 1 illustrating their relative locations.

Each of the engine mount assemblies 14 comprises as shown in FIGS. 2, 3 and 4, an inner cylindrical bushing 16 and an outer cylindrical bushing 18 which is outward of and concentric with the inner bushing 16. The outer bushing 18 has the form of a cage and comprises a pair of axially spaced, circular bars 20 and a pair of axially extending, diametrically opposite bars 22 which are integral at their opposite ends with the bars 20 and are located on opposite sides of the bushing 16 as best shown in FIG. 3. Cylindrical cages or sleeves 24, 26 and 28 of progressively smaller diameter are located intermediate of and concentric with the outer bushing or cage 18 and the inner bushing 16. The cages 24, 26 and 28 each have a shape similar to the outer cage 18 having circular bars 30, 32 and 34 spaced intermediate the outer bars 20 and the bushing 16 and axially extending bars 36, 38 and 40 spaced intermediate the outer bars 22 and the inner bushing 16. Resilient bodies 42, 44, 46 and 48 of material such as rubber are molded in the spaces intermediate the cages 18 and 24, cages 24 and 26, cages 26 and 28, and cage 28 and inner bushing 16, respectively. As best shown in FIG. 4, there is no resilient material provided where there are no radially opposed bars or no radially opposed inner bushing area and bars.

The engine mount assembly 14 further comprises a pair of identical frame mounting brackets 50 which are spaced as shown in FIGS. 1 and 2 and are secured at their bases by bolts 54 to the engine frame. Brackets 50 each have an arm 52 which extends toward the engine and has a slot 56 which is elongated in the fore and aft direction of the vehicle. The bushing and cage assembly which is held together by the resilient material is located between the bracket arm 52 and is fixed thereto by a clamp assembly including a bolt 58. Bolt 58 extends through the inner bushing 16 and through the bracket slots 56. At the head end of the bolt 58 there are provided washers 60 on opposite sides of the respective bracket arm 52 and, similarly, at the threaded end of the bolt there are provided another pair of washers 60 on opposite sides of the bracket arm at this end. The axial length of the inner bushing 16 is such that it abuts the inboard washers so that on tightening of a nut 62 on the bolt 58, the intermediate bushing 16 is clamped to the bracket arms and thereby prevented from moving relative to the frame with the elongated slots 56 providing for adjustment of the position on the frame in the fore and aft direction of the vehicle. The engine mount assembly is secured to the engine 10 by a U-shaped engine mounting bracket 64 which straddles the outer bushing 18 and has its feet 66 on opposite sides of the bushing assembly secured by bolts 68 to one side of the engine 10, the internal size of the engine mounting bracket being such that the outer cage 18 is securely clamped against movement relative to the engine on tightening of the securing bolts.

Both of the engine mount assemblies 14 are arranged relative to the vertical, forward and lateral directions of movement of the engine as best shown in FIG. 4, these three directions being mutually perpendicular to each other. With such arrangement, each of the engine mounts provides three definable spring rates to control the three basic modes of engine vibrations, namely, an axial spring rage $K_S$ to control engine roll, and a variable radial spring rate which provides a radial spring rate $K_{F-A}$ to control fore and aft engine motion and a radial spring rate $K_C$ to control vertical engine motion. The spring rates $K_S$, $K_{F-A}$ and $K_C$ because of the respective directions of force may also be called shear rate, fore and aft rate and compression rate, respectively.

Figure 5:
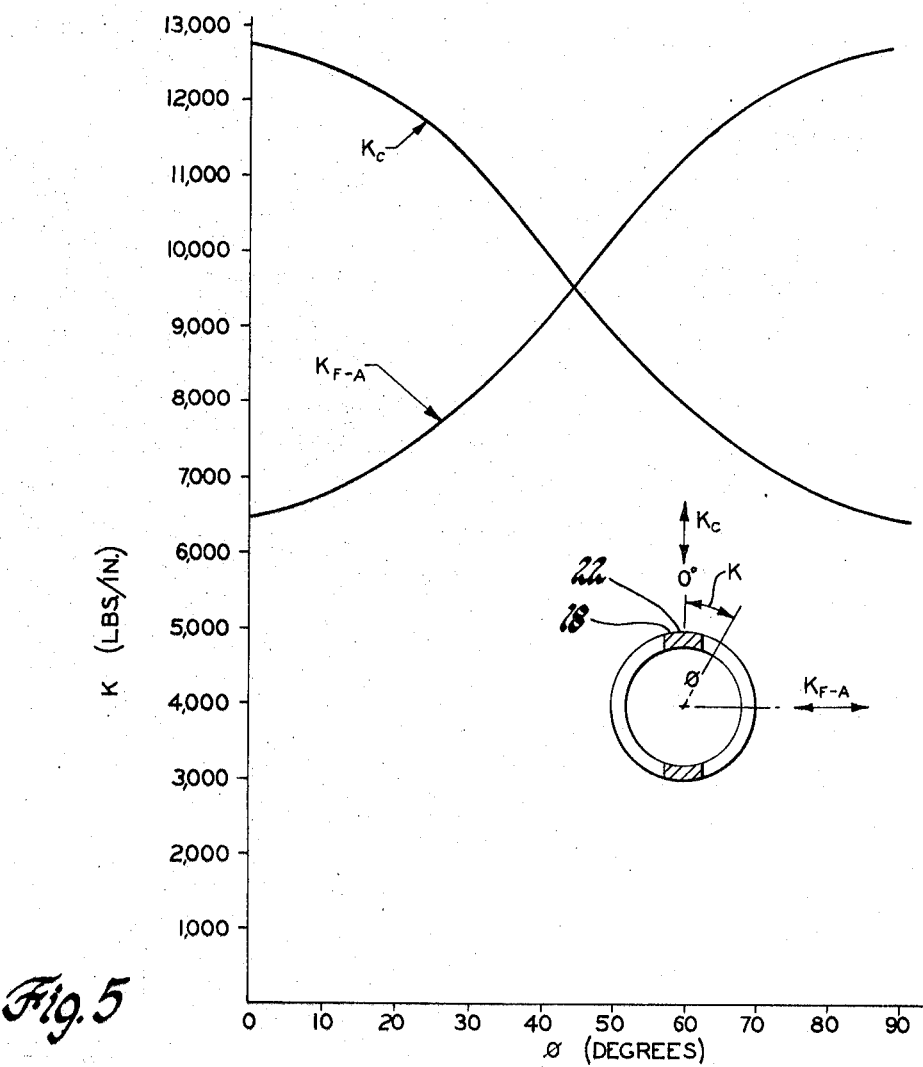
FIG. 5 is a graph showing typical adjustable spring rates provided by an engine mount assembly constructed according to the present invention.

To illustrate the adjustability in radial spring rate provided by the engine mounts according to the present invention, reference is made to FIG. 5. In FIG. 5 radial spring rate K in pounds per inch deflection is plotted along the ordinate and angularity $\phi$ in degrees of the axially extending bars of the cages relative to a base reference is plotted along the abscissa. The base reference for plotting of the angularity is shown in FIG. 5 by an inset of the outer cage 18 with one of its bars 22 at 0° with the compression rate $K_C$ determined to control engine motion in this radial direction relative to the mount and the fore and aft rate $K_{F-A}$ determined to control fore and aft engine motion in the radial direction relative to the mount perpendicular to the $K_C$ direction. With such reference, the compression rate $K_C$ is maximum at zero degrees while the fore and aft spring rate $K_{F-A}$ is minimum at this same angle. This results from the axially extending bars of the cages being in line to force compression of the resilient material on either side of the inner bushing to resist movement in this zero angle direction in addition to the compression forced by the circular bars while there are only circular bars to force compression of the resilient material on either side of the inner bushing to resist engine motion in the fore and aft direction. Then when angle $\phi$ is increased from zero, the axially extending bars provide progressively less compression effect in the determination of $K_C$ while providing progressively more effect in the determination of $K_{F-A}$. With the transverse symmetry of the cages, the axially extending bars at angle $\phi$ of 45° provide the same effect relative to the compression and fore and aft directions and therefore $K_C$ and $K_{F-A}$ are equal at this angle. The compression rate $K_C$ continues to decrease with increasing angle $\phi$ until it reaches a minimum at 90° while the fore and aft rate $K_{F-A}$ reaches its maximum at 90°, the maximum $K_{F-A}$ being equivalent to the maximum $K_C$ and their minimum values also being equal because of the transverse symmetry of the bars. Furthermore, it will be apparent that while the angle $\phi$ is varied to vary both the compression and fore and aft spring rates, the shear rate $K_S$ which controls engine roll is not changed since the cage bars on change in angle do not present any change in angle to this force direction. Instead, the shear rate is adjusted, for example, by the interposition of the inner cages which has the effect of reducing the shear rate.

Thus, when the engine mount assemblies 14 are installed as shown in FIGS. 2, 3 and 4 with $\phi$ at zero degrees, they provide their maximum compression rate $K_C$ and minimum fore and aft rate $K_{F-A}$ and a fixed shear rate to control engine motion. Then if it is desired to increase the ratio of compression-to-fore and aft spring rate ($K_C/K_{F-A}$), the nut 62 is loosened on bolt 58 and the bolts 54 are loosened on engine mounting bracket 64. Then the inner bushings 16 and 18 with the intermediate resilient material and intermediate cages can be rotated to an angle providing the desired spring rate ratio to accurately tune the engine mount to the particular engine and vehicle combination and without changing the shear rate. Then at the desired angle $\phi$, the loosened bolts are tightened to fix the adjustable engine mount portion of the assembly in the adjusted position.

In the embodiment shown, there is thus provided an infinite number of selective compression and fore and aft spring rates for controlling different engine motions. However, where it is desired to provide predetermined steps of adjustment it is also contemplated that the outer cage may be provided with a polygon configuration with the engine mounting bracket correspondingly shaped with such arrangement in addition to providing fixed steps of adjustment also providing mechanical stops for holding such adjustment as compared with the frictional holding provided by the clamping in the embodiment shown. Furthermore, it will be understood that the intermediate cages are added to reduce shear rate and dependent upon the particular application, there may be no such intermediate cages or there may be more.

The above described embodiment is illustrative of the invention which may be modified within the scope of the appended claims.

I claim:

1. An engine mount assembly for resiliently supporting an engine on a frame comprising an inner member having an axis, an outer member spaced radially outward of said inner member, said outer member having a pair of bars located on opposite sides of said inner member and extending axially of said inner member, resilient material secured to said members in the space between said inner member and said bars whereby said resilient material provides a radial spring rate to control relative radial movement between said members that varies about said axis decreasing from a maximum in the radial direction of said bars, first bracket means for providing attachment of said inner member in an installation and permitting conjoint angular adjustment movement of said members about the axis of said member, second bracket means for providing attachment of said outer member in an installation and permitting conjoint angular adjustment movement of said members about the axis of said inner member whereby said members are conjointly adjustable to vary the position of said bars to provide an adjustable radial spring rate.

2. An engine mount assembly for resiliently supporting an engine on a frame comprising an inner member having an axis, an outer member spaced radially outward of said inner member, said outer member having a first pair of bars located on opposite sides of said inner member and extending axially of said inner member, said outer member further having a second pair of bars that are joined with said first pair of bars at axially spaced points along said first pair of bars and extend circumferentially about said inner member, resilient material secured to said members in the space between said inner member and all of said bars whereby said resilient material provides a radial spring rate to control relative radial movement between said members that varies about said axis from a maximum in the radial direction of said first bars to a minimum in a radial direction at right angles thereto and said resilient material also provides an axial spring rate to control relative axial movement between said members, first bracket means for providing attachment of said inner member in an installation and permitting conjoint angular adjustment movement of said inner member and said outer member about the axis of said inner member, second bracket means for providing attachment of said outer member in an installation and permitting conjoint angular adjustment movement of said inner member and said outer member about the axis of said inner member whereby said inner member and said outer member are conjointly adjustable to vary the position of said first pair of bars to provide an adjustable radial spring rate without changing the axial spring rate.

3. An engine mount assembly for resiliently supporting an engine on a frame comprising an inner bushing having an axis, an outer bushing spaced radially outward of and concentric with said inner bushing, said outer bushing having a first pair of bars that are diametrically opposite and are located on opposite sides of said inner bushing and extend axially of said inner bushing, said outer bushing further having a second pair of bars that are joined with said first pair of bars at axially spaced points along said first pair of bars and extend circumferentially about said inner bushing, resilient material secured to said bushings in the space between said inner bushing and all of said bars whereby said resilient material provides a radial spring rate to control relative radial movement between said bushings that varies about said axis from a maximum in the radial direction of said first bars to a minimum in a radial direction at right angles thereto and said resilient material also provides an axial spring rate to control relative axial movement between said bushings, first bracket means including pivot pin means extending through said inner bushing for providing attachment of said inner bushing in an installation and permitting conjoint angular adjustment movement of said bushings about said pivot pin means, second bracket means for providing attachment of said outer bushing in an installation and permitting conjoint angular adjustment movement of said bushings about the axis of said inner bushing whereby said bushings are conjointly adjustable to vary the position of said first pair of bars to provide an adjustable radial spring rate without changing the axial spring rate.

4. An engine mount assembly for resiliently supporting an engine on a frame comprising an inner bushing having an axis, an outer bushing spaced radially outward of and concentric with said inner bushing, said outer bushing having a pair of bars that are diametrically opposite and are located on opposite sides of said inner bushing and extend axially of said inner bushing, a sleeve spaced intermediate of and concentric with said bushings having bars radially aligned with the bars of said outer bushing, resilient material secured to said bushings and said sleeve in the spaces therebetween whereby said resilient material provides a radial spring rate to control relative radial movement between said bushings that varies about said axis decreasing from a maximum in the radial direction of said bars, first bracket means for providing attachment of said inner bushing in an installation and permitting conjoint angular adjustment movement of said bushings and said sleeve about the axis of said inner bushing, second bracket means for providing attachment of said outer bushing in an installation and permitting conjoint angular adjustment movement of said bushings and said sleeve about the axis of said inner bushing whereby said bushings and said sleeve are conjointly adjustable to vary the position of the axially extending bars to provide an adjustable radial spring rate.

5. A engine mount assembly for resiliently supporting an engine on a frame comprising an inner bushing having an axis, an outer bushing spaced radially outward of and concentric with said inner bushing, said outer bushing having a first pair of bars that are diametrically opposite and are located on opposite sides of said inner bushing and extend axially of said inner bushing, said outer bushing further having a second pair of bars that are joined with said first pair of bars at axially spaced points along said first pair of bars and extend circumferentially about said inner bushing, a plurality of radially spaced sleeves spaced intermediate of and concentric with said bushings having bars radially aligned with the bars of said outer bushing, resilient material secured to said bushings and said sleeves in the spaces therebetween whereby said resilient material provides a radial spring rate to control relative radial movement between said bushings that varies about said axis from a maximum in the radial direction of said first bars to a minimum in a radial direction at right angles thereto and said resilient material also provides an axial spring rate to control relative axial movement between said bushings, first bracket means for providing attachment of said inner bushing in an installation and permitting conjoint angular adjustment movement of said bushings and said sleeves about the axis of said inner bushing, second bracket means for providing attachment of said outer bushing in an installation and permitting conjoint angular adjustment movement of said bushings and said sleeves about the axis of said inner bushing whereby said bushings and said sleeves are conjointly adjustable to vary the position of the axially extending bars to provide an adjustable radial spring rate without changing the axial spring rate.

* * * * *